Aug. 4, 1953     K. WERNERT     2,647,772
BEARING SEAL FOR UNDERWATER USE
Filed Dec. 19, 1949
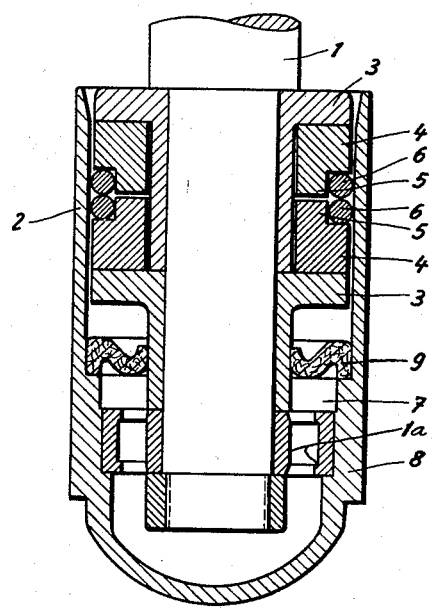
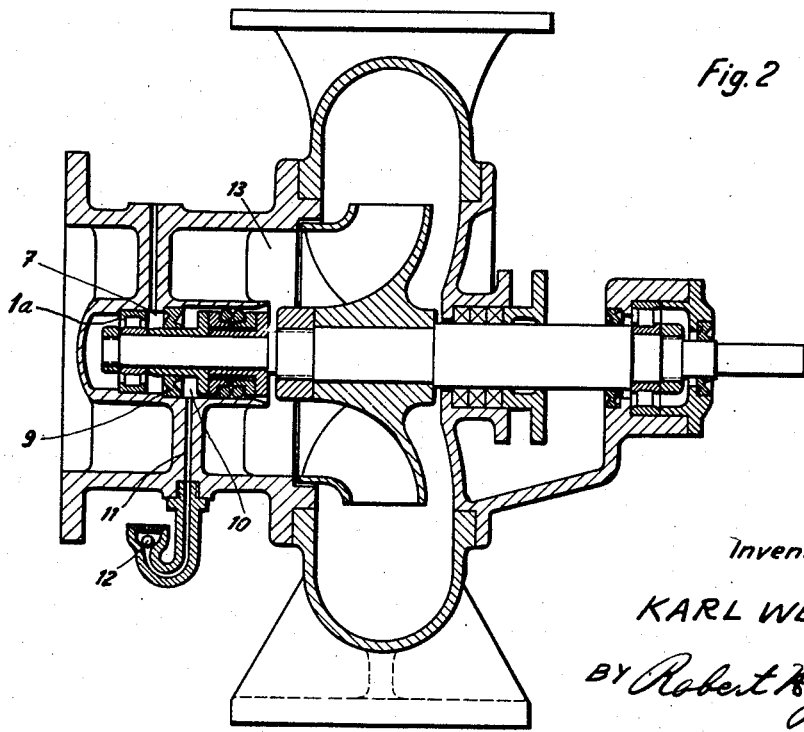
Inventor:
KARL WERNERT
BY Robert K. Jacob
HIS AGENT

UNITED STATES PATENT OFFICE 2,647,772

BEARING SEAL FOR UNDERWATER USE

Karl Wernert, Mulheim an der Ruhr, Germany

Application December 19, 1949, Serial No. 133,721
In Germany October 1, 1948

3 Claims. (Cl. 286—8)

The present invention relates to grease lubricated bearings for underwater use, and is particularly directed to bearings of this type in which the grease lubrication is reliably protected against the inflow of water.

Known grease lubricated bearings of this kind have the disadvantage that they do not prevent water from penetrating to the lubricating place, as the stuffing box packing or labyrinth packing used as sealing means usually wears out in a comparatively short time.

According to the invention the aforesaid drawback has been overcome by the provision of a pair of packing rings of coal, graphite or the like axially displaceably arranged with respect to each other between a second pair of packing rings of similar or other suitable material but different density mounted on the rotating shaft and determining the limits of the axial displacement of the first pair of packing rings, and a pair of rubber rings suitably positioned between the first pair of packing rings for forcing that first pair of packing rings away from each other against the second pair of packing rings while simultaneously bearing against the walls of the bearing bushing. This way of protecting the lubricating chamber against the influx of liquid has the advantage that, in spite of any wear that will occur, a snug and tight fit between the sealing surfaces is at all times assured, because of the elastic way in which the sealing surfaces are pressed against one another, and owing to the feature that the elastic pressing means are not participating in the rotation and for that reason are not subjected to wear. Moreover, through adequate selection of the material used in the construction of the packing rings and surfaces sliding on each other, the wear can be reduced to a minimum.

Depending upon the liquid pressure against which the lubricating chamber has to be protected, either one or a plurality of sealing chambers, formed by the packing rings, may be arranged behind one another.

For pumps, particularly pumps of the type which have to be immersed in wells, it is advisable to arrange the bearing, described in this specification, at the end of the shaft facing the suction branch. In this way it is possible to avoid the otherwise customary overhung arrangement of the rotor and the provision of the heavy and powerful bearing means for the shaft at the outside of the pump housing, compared with which the construction disclosed in the present application represents an important improvement and considerable simplification. For pumps which are immersed in wells, so-called underwater pumps, the present invention puts an end to all of the troubles which constantly occurred in the bearing at the end of the shaft facing the suction branch, which bearing, when there was sand in the water, would quickly wear out and thereby destroy, through lack of proper guidance of the shaft, the entire rotor.

The invention will best be understood from a consideration of the following detailed description, taken in connection with the accompanying drawings, showing by way of example two embodiments of the invention. However, it is to be understood that the invention is not confined to any strict conformity with the showing of the drawings, but may be changed or modified, so long as such changes or modifications mark no material departure from the salient features of the invention as expressed in the appending claims.

In the drawings, in which similar numerals of reference indicate corresponding parts in both of the figures—

Fig. 1 is a longitudinal section of the first embodiment;

Fig. 2 is a longitudinal section of a centrifugal pump, having a bearing as disclosed in this specification arranged in the suction branch of the pump.

Referring now to the drawings in detail, the reference numeral 1 (in Fig. 1) designates the pump shaft journaled in the greased bearing 2 in which it is supported at one end by a bearing 1a, constituted by an annular member having large openings permitting the flow of oil to the front of the bearing housing. Mounted on shaft 1 for rotation therewith are the packing rings 3. Positioned between the two packing rings 3 are the packing rings 4, which do not rotate with the shaft and are provided with the flanges 5 extending toward each other in axial direction of the shaft. The rubber rings 6, arranged between the two packing rings 4, tend to force the packing rings 4 away from each other in axial direction and to press them against the packing rings 3. They are in tight contact with their surroundings everywhere and thereby prevent water from passing along the outer surface of the packing rings 4 into the grease chamber 7. The packing rings 4 consist of coal, graphite or the like, while the packing rings 3 are made of similar or other suitable material of either smaller or greater density. The bearing bushing 8 is immersed in the water.

When shaft 1 is rotated, the packing rings 3 participate in that rotation, while the packing rings 4 remain at a standstill, being prevented from joining in that rotation by the rubber rings 6. But because of the pressure exerted against the packing rings 4 by the rubber rings 6, the packing rings 4 are forced away from each other against the packing rings 3 and thus act as a packing.

In the embodiment illustrated in Fig. 2 the end of the shaft facing the suction branch has been arranged in the bearing bushing in the hereinbefore disclosed manner, whereby, by means of the leather collar 9, a vacant chamber 10 has been formed in front of the grease chamber 7. The vacant chamber 10 is provided with an outlet 11 leading to the outside. Arranged in the outlet 11 is a check valve in form of a ball 12. If by any chance water should penetrate into the vacant chamber 10 it can flow off through the outlet 11.

If, because of leakage in the suction piping, air should be sucked into the suction chamber 13 while the pump is in operation, the outlet 11 will be automatically closed by the check valve 12, which merely permits the outflow of water, but not the entrance of air.

What I claim as new and desire to secure by Letters Patent of the United States is:

1. In a grease lubricated bearing for underwater use the combination with a rotatable shaft and a bearing bushing and bearing and lubricating means for that shaft, of a pair of packing rings rigidly mounted on said shaft for rotation therewith and suitably spaced apart and arranged with respect to said lubricating means; a second pair of packing rings loosely arranged between said first pair of packing rings and adapted to be shifted in axial direction of said shaft; and a pair of rubber rings suitably arranged between said bushing and said second pair of packing rings and adapted to elastically force said second pair of packing rings in axial direction away from each other against said first pair of packing rings while bearing against said bushing, to thereby produce a water-tight packing for said lubricating means.

2. A grease lubricated bearing as specified by claim 1, including additional packing means arranged between said bearing means and said pairs of packing rings in such a way that between said additional packing means and said pairs of packing rings a vacant chamber is created, and discharged piping connected to said vacant chamber and leading from said vacant chamber to the outside for the discharge of liquid from said vacant chamber.

3. A grease lubricated bearing as specified by claim 1, including additional packing means arranged between said bearing means and said pairs of packing rings in such a way that between said additional packing means and said pairs of packing rings a vacant chamber is created; discharge piping connected to said vacant chamber and leading from said vacant chamber to the outside for the discharge of liquid from said vacant chamber; and a check valve arranged in said discharge piping and adapted to automatically check the influx of water and air into said discharge piping from the outside.

KARL WERNERT.

References Cited in the file of this patent

UNITED STATES PATENTS

| Number | Name | Date |
|---|---|---|
| 1,243,712 | Clark | Oct. 23, 1917 |
| 2,049,955 | Gilbert | Aug. 4 1936 |
| 2,253,754 | Bousman | Aug. 26, 1941 |